(12) United States Patent
Tang et al.

(10) Patent No.: US 11,461,482 B2
(45) Date of Patent: Oct. 4, 2022

(54) METHOD FOR ERASING INFORMATION FROM ELECTRONIC SCRAP BASED ON DUAL-SECURITY MECHANISM

(71) Applicant: Beijing University of Technology, Beijing (CN)

(72) Inventors: Jian Tang, Beijing (CN); Dandan Wang, Beijing (CN); Xiaozhong Zhou, Beijing (CN)

(73) Assignee: Beijing University of Technology, Beijing (CN)

( * ) Notice: Subject to any disclaimer, the term of this patent is extended or adjusted under 35 U.S.C. 154(b) by 310 days.

(21) Appl. No.: 16/822,154

(22) Filed: Mar. 18, 2020

(65) Prior Publication Data

US 2021/0150041 A1    May 20, 2021

(30) Foreign Application Priority Data

Nov. 15, 2019    (CN) .......................... 201911116710.X

(51) Int. Cl.
*G06F 21/60* (2013.01)
*G06F 11/14* (2006.01)
(Continued)

(52) U.S. Cl.
CPC ........ *G06F 21/604* (2013.01); *G06F 11/1469* (2013.01); *G06F 21/6218* (2013.01); *G06F 2201/80* (2013.01); *G06Q 10/30* (2013.01)

(58) Field of Classification Search
CPC ............... G06F 21/604; G06F 21/6218; G06F 11/1469; G06F 2201/80
(Continued)

(56) References Cited

U.S. PATENT DOCUMENTS 4,149,262 A * 4/1979 Lamb ................ G06F 16/90339
707/999.005
5,193,149 A * 3/1993 Awiszio ................ H04L 49/254
709/250
(Continued)

FOREIGN PATENT DOCUMENTS

CN            103117084           5/2013
CN            103294960           9/2013
(Continued)

OTHER PUBLICATIONS

Cojocar, Lucian, Kaveh Razavi, and Herbert Bos. "Off-the-shelf embedded devices as platforms for security research." In Proceedings of the 10th European Workshop on Systems Security, pp. 1-6. 2017. (Year: 2017).*

(Continued)

*Primary Examiner* — Luu T Pham
*Assistant Examiner* — Walter J Malinowski

(57) ABSTRACT

According to aspects of the inventive concepts, provided is a method for erasing information based on a dual-security mechanism. A storage medium feature database, an information erasure feature database, and a firmware system feature database are built to match cases for to-be-erased electronic scrap. An erasure solution and a native system data package are generated based on the matching results. The information is erased and an erasure result is evaluated; and the information is recovered on the erased electronic scrap, and a recovery result is evaluated, to implement comprehensive double security evaluation. The information erasure validity of the electronic scrap is checked based on the evaluation results. If an erasure result is invalid, erasure solutions are corrected online based on the evaluation result, until the erasure result is valid and the electronic scrap with a native system recovered is obtained.

3 Claims, 5 Drawing Sheets

(51) Int. Cl.
 *G06F 21/62* (2013.01)
 *G06Q 10/00* (2012.01)
(58) Field of Classification Search
 USPC .......................................................... 726/1
 See application file for complete search history.

(56) References Cited

U.S. PATENT DOCUMENTS

| | | | | |
|---|---|---|---|---|
| 5,958,062 | A * | 9/1999 | Komasaka | G06F 11/27 714/1 |
| 9,286,231 | B2 | 3/2016 | Vaisanen et al. | |
| 10,175,891 | B1 * | 1/2019 | Malwankar | G06F 3/0611 |
| 11,115,272 | B1 * | 9/2021 | Kumar | H04L 41/0806 |
| 11,120,136 | B1 * | 9/2021 | BeSerra | G06F 8/656 |
| 2003/0133409 | A1 * | 7/2003 | Corazza | H04W 52/367 370/329 |
| 2004/0012812 | A1 * | 1/2004 | Shimizu | G06F 3/1205 358/1.14 |
| 2004/0034766 | A1 * | 2/2004 | Sakamura | G07F 7/1008 713/2 |
| 2005/0021355 | A1 * | 1/2005 | Brendle | G06F 16/252 705/1.1 |
| 2005/0289402 | A1 * | 12/2005 | Neri | G06F 11/1064 714/52 |
| 2006/0010150 | A1 * | 1/2006 | Shaath | G06F 16/125 707/999.102 |
| 2006/0107071 | A1 * | 5/2006 | Girish | G06F 21/572 713/191 |
| 2008/0005452 | A1 * | 1/2008 | Suda | G06F 11/3485 711/E12.008 |
| 2008/0037658 | A1 * | 2/2008 | Price | H04N 21/23892 704/E19.048 |
| 2008/0140724 | A1 * | 6/2008 | Flynn | G06F 3/0656 711/E12.04 |
| 2008/0140910 | A1 * | 6/2008 | Flynn | G06F 11/108 711/E12.04 |
| 2008/0155224 | A1 * | 6/2008 | Crandall | G06F 12/10 711/E12.016 |
| 2009/0073841 | A1 * | 3/2009 | Pasquariello | G11B 7/126 369/59.26 |
| 2009/0248604 | A1 * | 10/2009 | Masson | G16H 50/50 705/2 |
| 2009/0319782 | A1 * | 12/2009 | Lee | |
| 2010/0037232 | A1 * | 2/2010 | Lee | |
| 2010/0156896 | A1 * | 6/2010 | Ichimura | G06T 1/00 382/154 |
| 2013/0185555 | A1 * | 7/2013 | Wang | G06F 3/065 713/165 |
| 2013/0198440 | A1 * | 8/2013 | Oh | G06F 12/0246 711/103 |
| 2014/0380125 | A1 * | 12/2014 | Calder | G06F 11/10 714/766 |
| 2015/0169462 | A1 | 6/2015 | Vaisanen et al. | |
| 2016/0328180 | A1 * | 11/2016 | Wang | G06F 3/0683 |
| 2017/0041296 | A1 * | 2/2017 | Ford | G06F 16/951 |
| 2017/0339250 | A1 * | 11/2017 | Momchilov | G06F 9/45558 |
| 2019/0034107 | A1 * | 1/2019 | Kim | G06F 11/1471 |
| 2019/0212942 | A1 | 7/2019 | Kellokoski et al. | |
| 2021/0064471 | A1 * | 3/2021 | Park | G06F 8/61 |
| 2021/0083693 | A1 * | 3/2021 | Danilov | H03M 13/154 |
| 2021/0173588 | A1 * | 6/2021 | Kannan | G06F 11/0727 |

FOREIGN PATENT DOCUMENTS

| | | | | |
|---|---|---|---|---|
| CN | 103295638 | | 9/2013 | |
| CN | 103902468 | | 7/2014 | |
| CN | 105630418 | A * | 6/2016 | G06F 3/0614 |
| CN | 106909542 | | 6/2017 | |
| CN | 107277089 | | 10/2017 | |
| CN | 107562376 | | 1/2018 | |
| CN | 107562384 | | 1/2018 | |
| CN | 107562384 | A * | 1/2018 | |
| CN | 108271150 | | 7/2018 | |
| CN | 108921229 | A * | 11/2018 | |
| CN | 109656888 | | 4/2019 | |
| CN | 109683918 | | 4/2019 | |
| EP | 3422237 | A1 * | 1/2019 | G06F 21/335 |
| JP | 3615174 | B2 * | 1/2005 | G11B 20/00086 |
| JP | 2010176387 | A * | 8/2010 | |
| JP | 2015141643 | A * | 8/2015 | |
| WO | WO-2016019236 | A1 * | 2/2016 | G06Q 30/0278 |
| WO | 2018141929 | | 8/2018 | |
| WO | WO-2020169876 | A1 * | 8/2020 | G06F 21/78 |

OTHER PUBLICATIONS

Diesburg, Sarah, Christopher Meyers, Mark Stanovich, Michael Mitchell, Justin Marshall, Julia Gould, An-I. Andy Wang, and Geoff Kuenning. "Trueerase: Per-file secure deletion for the storage data path." In Proceedings of the 28th annual computer security applications conference, pp. 439-448. 2012. (Year: 2012).*

Reardon, Joel, David Basin, and Srdjan Capkun. "Sok: Secure data deletion." In 2013 IEEE symposium on security and privacy, pp. 301-315. IEEE, 2013. (Year: 2013).*

Hao, Feng, Dylan Clarke, and Avelino Francisco Zorzo. "Deleting secret data with public verifiability." IEEE Transactions on Dependable and Secure Computing 13, No. 6 (2015): 617-629. (Year: 2015).*

Onarlioglu, Kaan, William Robertson, and Engin Kirda. "Eraser: Your data won't be back." In 2018 IEEE European Symposium on Security and Privacy (EuroS&P), pp. 153-166. IEEE, 2018. (Year: 2018).*

Li, Long, Jing Wei, C. B. Li, Y. Cao, and B. Fang. "Prediction of load model based on artificial neural network." Transactions of China Electrotechnical Society 30, No. 8 (2015): 225-230. (Year: 2015).*

Zhou, J. "Research on the Promotion of Standardization to Promote the Development of China's Waste Mobile Phone Recycling Industry", Quality and Standardization, 2018, (01)41-43, pp. 643-647 (Translation of abstract only).

Ye, D. "Talking about the recycling of electronic waste such as computer phones", Resource Conservation and Environmental Protection, 2014 (01)144. (Translation of abstract only).

Wang, J. "Data destruction: An Important Branch of Data Security", Computer Security, 2006 (08) 53-54. (Translation of abstract only).

Ye, Q. "Research on MDA-based SQLite Fragment Data Erasure Technology", Kunming University of Science and Technology, 2016. (Translation of abstract only).

Xu, J. et al. "Research of Data Destruction Based-on Magnetic Storage Media", Journal of Southwest China Normal University (Natural Science Edition) (Aug. 2007), vol. 32 No. 4, pp. 107-110. (Translation of abstract only).

Yin, Y. et al. "Computer Data Secure Delete and Privacy Protect", Information Network Security, 2009(05)55-58. (Translation of abstract only).

Chen, E. et al. "Design and Implementation of Database Destroy System", Computer Engineering and Design (May 2008) vol. 29, No. 10, pp. 2499-2501. (Translation of abstract only).

Wang, B. et al. "Research and verification of write overlay information elimination technology", Proceedings of the 18th National Conference on Information Confidentiality, Beijing Jincheng Publishing House. (Translation of abstract only).

Wei, C. et al. "Application and Research on Data Destruction Technology", Computer and Modernization, 2010 (10) pp. 180-182. (Translation of abstract only).

Li, T. "Information Storage and Information Destruction Technology", Information Security and Technology, 2010 (06) pp. 45-48. (Translation of abstract only).

Shen, H. "On the Technology for Eliminating Information", Information Security and Communication Confidentiality, 2009(08)92-94 (Translation of abstract only).

Lu, Z. et al. "Data Self-Destruction Method", Application Research of Computers (2009), 26(01) pp. 350-351, 355. (Translation of abstract only).

(56) References Cited

OTHER PUBLICATIONS

Wang, B. et al. "Research and Implementation of the Information Elimination Technology on Storage Medium", Beijing Jiaotong University, 2009. (Translation of abstract only).
Bai, Y. "Research and Implementation of Magnetic Media Data Wipe Technology on Windows Platform", Hubei University of Technology, 2010. (Translation of abstract only).
Qi, F. et al. "Research on Information Elimination Methods for Solid State Storage Devices and Devices", Secrecy Science and Technology (2011), (06) pp. 54-59. (Translation of abstract only).
Sun, D. "Design and Implementation of Data Recovery and Erasure Software Based on Android", Beijing University of Posts and Telecommunications, 2014. (Translation of abstract only).
Zhou, K. et al. "Study on the Sanitization and Security of Data Remanence", Science Technology and Engineering (Sep. 2006), vol. 6 No. 17, pp. 2769-2771. (Translation of abstract only).
Wu, S. et al. "Storage Medium-Oriented Data Secure Deletion", 2017,26(11)36-44. (Translation of abstract only).
Fang, S. et al. "Development and Application of Parallel High-Speed Electronic Data Destruction Platform", Heilongjiang Electric Power (2017), 39(06)547-550+556 (Translation of abstract only).
Du, X. "Secure Erase Hard Drive Data in the Study of Residual", Hebei University of Science and Technology, 2012. (translation of abstract only).
Gutmann, P. "Secure Deletion of Data from Magnetic and Solid-State Memory", Sixth USENIX Security Symposium Proceedings, San Jose, California, Jul. 22-25, 1996.
Wei, M. et al. "Reliably Erasing Data From Flash-Based Solid State Drives".
Fundo, A. et al. "Secure Deletion of Data from SSD", International Journal of Advanced Computer Science and Applications (IJACSA) (2014), vol. 5, No. 8, pp. 131-134.
Sun, K. et al. "Models and Design of an Adaptive Hybrid Scheme for Secure Deletion of Data in Consumer Electronics", IEEE Transactions on Consumer Electronics (Feb. 2008), vol. 54, No. 1, pp. 100-104.
Lee, J. et al. "Secure Deletion for NAND Flash File System", SAC '08, Fortaleza, Ceará, Brazil (Mar. 16-20, 2008), pp. 1710-1714.
Swanson, S. et al. "SAFE: Fast, Verifiable Sanitization for SSDs Or: Why encryption alone is not a solution for sanitizing SSDs", Non-Volatile Systems Laboratory, Computer Science & Engineering, University of California, San Diego (Oct. 13, 2010) Rev v0.6.1.
Liu, Chen et al. "ErasuCrypto: A Light-weight Secure Data Deletion Scheme for Solid State Drives", Proceedings on Privacy Enhancing Technologies (2017) vol. 1, pp. 132-148.
Reardon, J. et al. "SoK: Secure Data Deletion", Institute of Information Security, ETH Zurich, Zurich, Switzerland.
Gnatyuk, S. et al. "Modern Method and Software Tool for Guaranteed Data Deletion in Advanced Big Data Systems", Springer Nature Switzerland AG 2020, Z. Hu et al. (eds.), "Advances in Artificial Systems for Medicine and Education II", Advances in Intelligent Systems and Computing vol. 902 pp. 581-590.

* cited by examiner

METHOD FOR ERASING INFORMATION FROM ELECTRONIC SCRAP BASED ON DUAL-SECURITY MECHANISM

CROSS REFERENCE TO RELATED APPLICATIONS

The present application claims the benefit of priority under 35 USC 119 to Chinese patent application 201911116710.X, filed Nov. 15, 2019, the contents of which are incorporated herein by reference.

TECHNICAL FIELD

The present invention relates to the technical field of information erasure for electronic products, and in particular, to a method for erasing information from electronic scrap based on a dual-security mechanism.

BACKGROUND

In China, the update of electronic products such as smartphones and computers is accelerating with the continuous development of science and technology, resulting in an increasingly large amount of electronic scrap. Waste of resources, environmental pollution and information security problems due to improper treatment of the electronic scrap are getting worse. According to statistics, China's users change their mobile phones on average in 15 months, of which 20% will change their mobile phones within one year. According to statistics from the Ministry of Industry and Information Technology, as of October 2015, China has 1.302 billion mobile phone users, about 200 million mobile phones are discarded each year, but the recycling rate is less than 1% [1]. Computers are updated every 18 months, and 6 million scrap computers are produced each year in mainland China. This electronic scrap contains a lot of valuable metals. For example, a scrap computer contains 1.2% copper alloy, 1% precious metal alloy (such as gold, silver, and palladium), and each ton of scrap mobile phones contains about 280 g/t copper, 2 kg/t gold, 100 kg/t silver, and 100 g/t palladium [2]. Therefore, the improper treatment of electronic scrap will cause serious waste of resources and environmental pollution.

Under the nation's increasing emphasis on environmental protection and reuse of resources, the recycling of electronic scrap has received attention from the whole society [3]. At present, electronic scrap is mainly recycled by roadside mobile vendors and maintenance service providers, circulated in second-hand markets, received by regular enterprises for trade-in, and donated to underdeveloped areas. Due to the outdated technologies and equipment of recyclers and dealers, the second-hand electronic products obtained by the mobile traders are divided into non-reusables and reusables. The non-reusables are disassembled by small workshops and then subjected to strong acid or incineration to extract precious metals, with other parts discarded. The reusables are sold after simple repair, refurbishment, or assembly[1]. In recent years, some online and offline recycling platforms resell the scrap mobile phones after simple information erasure. However, the lack of relevant industry standards, laws and regulations, as well as the existence of a large amount of mobile traders, affect the development of formal recycling institutions. As a result, electronic scrap does not go through any or complete information erasure in the process from recycling to reselling. A large amount of user data is left in these products, which may involve the privacy and confidential information of individuals, enterprises, state agencies or even secrecy departments. This will seriously threaten user privacy and even national security [4].

Information erasure uses various technical means to completely erase the private data in a storage device, to avoid data disclosure [5]. Generally, the typical information deletion and formatting functions of an electronic device cannot really erase data on a storage medium of the device. Instead, the data can be recovered through simple processing of dedicated software[6]. Degaussing, thermal removal, physical destruction, and chemical corrosion on the storage medium can completely erase the information, but also destroy the storage medium. Therefore, such methods provide high security but compromise cost efficiency [7]. The preceding technologies cannot meet the technical requirements for erasing information from electronic scrap. There is still another technique: data overwriting, which uses meaningless and irregular data to overwrite raw privacy and confidential data. Theoretically, the original data information can be overwritten after a single overwrite. However, there may be some data residue, so overwriting needs to be performed several times in different ways to ensure the security. Currently, most overwriting software vendors use US DOD 5220.22M standard. According to this standard, random numbers are overwritten first, then complement numbers of the random numbers, and once again, random numbers [8]. In theory, data on the storage medium can be effectively destroyed as long as the number of overwrites is sufficient [9]. The BMB21-2007 standard issued in 2007, Security and Confidentiality Requirements for the Destruction of Carriers Involving State Secrets and Information Erasure, affirms the overwriting technology and specifies the overwrite times and data formats [10]. From this perspective, overwriting is the most cost-effective method for information erasure currently [11].

Information erasure and information recovery, as two important components of information security, are both complementary and contrary. They are complementary because they are indispensable different applications in the information security field. They are contrary in terms of techniques and applications [3]. The continuous improvement of the information recovery technology poses increasingly high requirements for the information erasure technology.

In China, information erasure technologies are still evolving, with the focus on discussions about the importance of information erasure [4]. In recent years, China's research on technologies for erasing information from different storage media has made some progress. For magnetic storage media, literature [5] expounds different information erasure methods and their comparative research, and puts forwards the concepts of remote destruction and self-destruction to ensure information security. Literature [12] analyzes the advantages and disadvantages of various overwriting sequences in the overwriting technology, designs a new overwriting solution, and puts forward a data destruction software system for magnetic medium based on network security. Literature [13] designs an electronic file shredder and information erasure software for magnetic hard drives. And literature [14] provides a convenient, secure, and user-friendly magnetic medium information erasure solution based on Windows file systems. For flash-based storage media, literature [15] analyzes information erasure on solid state memory. Literature [16] designs information recovery and erasure software based on the study of Android storage system. Literature [4] designs a platform-independent fragment information erasure model for SQLite database, to erase fragment information on different platforms, where the model is built on a model-driven framework.

For the information erasure technology itself, literature [17] proposes a new method for erasing residual data. Literature [18] provides an erasure method with customizable overwrite times and literature [19,20] puts forward the idea of parallel data destruction to improve the information erasure efficiency. Literature [21] proposes security level-based information erasure, which is also the mainstream solution for existing information erasure equipment/software in the domestic market. Its overwriting policy is based on some foreign overwriting standards, with the security to be tested. In recent years, a variety of domestic patents for information erasure have emerged in China, but most of them are designed based on information erasure systems. Literature [22,23] designs a portable disk information erasure system and device. Literature [24] designs an overall information erasure system, including a front-end erasure device and a back-end server, and proposes global overwriting+local random overwriting to improve the erasure efficiency. Literature [25] provides a system that realizes real-time monitoring and effective log management of information erasure. Literature [26] designs a QR code-based security management solution for secret-related storage media. And literature [27] provides a process for erasing Linux-based disk files, and their traces and logs.

There are also a few patents for inventions for information erasure technologies. Literature [28,29,30] proposes different solutions for the failure to securely erase user data from the flash memory in time due to remote update, to eliminate common security risks while mitigating system burden. And literature [31] provides a method for erasing information based on a quantum random number generator, to effectively improve the overwriting efficiency and security. In summary, there still lacks theoretical support, technological innovation, and integrated system design for information erasure technologies in China. There also lacks information erasure specifications for civil industry.

Foreign countries give more emphasis on the study of information erasure technologies, and have developed corresponding specifications for each information erasure technology. For example, foreign countries have developed many standards for overwriting technologies, for different users and organizations to securely and efficiently erase information [4]. In the 1990s, foreign scholars had made many achievements in the study of flash-based information erasure. Gutmann [32] made in-depth analysis on the magnetic memory and random access memory, and proposed effective information recovery and information erasure methods. For the effect of applying the mature disk information erasure technologies to flash memory, the study made by Wei et al. [33] and Fundo et al. [34] shows that the complex structure of the latter poses higher requirements for information erasure solutions.

Literature [35] proposes an adaptive hybrid erasure solution based on the cost and benefit model, which can, in theory, securely and efficiently erase data in multiple flash storage modes. Literature [36, 37] provides encryption-based secure file erasure solutions to securely erase file keys and original data. Literature [37] also puts forward trusted information erasure verification solutions for governments, businesses, and individuals. For the issue that the service life of SSDs is damaged by data migration or block cleanup caused by purge- and encryption-based information erasure, Liu et al. proposes an ErasuCrypto solution. This solution not only addresses the said issue, but also erases invalid data [38].

Foreign countries have made deep research into information erasure of smart mobile terminals, and provide well-designed solutions for different physical storage interfaces to securely and effectively erase data from physical storage devices in different file systems [39]. For today's big data systems, Gnatyuk et al. [40] designs STM Shredder software based on a pseudo-random sequence generator to erase information securely and quickly. At present, most of the foreign patents for inventions related to information erasure are about the overwriting technologies. For example, literature [41] designs an overwriting solution based on multiple overwrites and verifications on generated non-compressed data blocks, which can effectively meet the overwriting requirement of "compression before storage" Literature [42] proposes a verification scheme of first performing consistency check and then comparing a known overwrite sequence with a sequence read out after erasure; and literature [43] provides an information erasure solution based on file overwriting.

In general, the information erasure process used by foreign patents is: generating an overwrite sequence based on the capacity of a to-be-erased area, obtaining an address of the area and performing overwriting cyclically, and verifying a result of each overwriting. In addition, the study, application, and industry development of foreign information erasure technologies are quite advanced. Blancco provides a systematic secure information erasure service, its products use more than 20 overwriting standards of different countries, and its customers spread around the globe, but its security is still in doubt. In short, information erasure with multiple-security guarantee that is customized based on features of the electronic scrap is still not available, and there is no research on online correction of erasure solutions. Therefore, it is difficult to balance the efficiency and security in the information erasure process.

To sum up, the complexity of flash memory and the diversity of existing storage media in the market make a generic and effective information erasure solution impossible.

SUMMARY

Recycling the increasing large amount of electronic scrap has become a trend to avoid waste of resources and environmental pollution. However, the difficulty in secure erasure of information in the electronic scrap badly limits the recycling rate. The existing information erasure devices and software in the market mostly use security level-based overwriting technologies, and the overwriting policies are also based on foreign standards, making it hard to ensure a secure and efficient information erasure process for the electronic scrap. To resolve the foregoing problems, this application proposes an information erasure method based on a dual-security mechanism, including a feature data case matching module, an information erasure and recovery evaluation module, an erasure solution adjustment and native system recovery module. Firstly, use a feature data case matching module to match feature data cases by: identifying a storage medium feature of to-be-erased electronic scrap and identifying an information erasure feature of the electronic scrap, then combining with a storage medium feature database and an information erasure feature database to match and determine an erasure solution; and identifying a firmware system feature of the electronic scrap and matching a similar case in a firmware system feature database to determine a native system data package for rewriting after the information is securely erased. Then, use an information erasure and recovery evaluation module to execute the erasure solution for the electronic scrap, extract a feature of the erased electronic scrap in this step, and build an information erasure evaluation model to evaluate an information erasure effect; use an information recovery mechanism to recover the information on the erased electronic scrap, extract an information recovery feature, and build an information recovery evaluation model to evaluate an information recovery effect; and build a comprehensive dual-security evaluation model based on field-specific expert knowledge and the preceding evaluation results, to obtain a comprehensive dual-security evaluation value. Lastly, determine whether the information erasure meets a set standard; and if the information erasure does not meet the set standard, correct an erasure solution according to the evaluation result and evaluating an information erasure and recovery effect, until the information erasure result meets the standard; or if the information erasure meets the set standard, perform a last erasure operation on the erased electronic scrap to erase the recovered information, format the electronic scrap, and write a matching native system into the electronic scrap to obtain the electronic scrap with the native system recovered.

DETAILED DESCRIPTION

Figure 1:
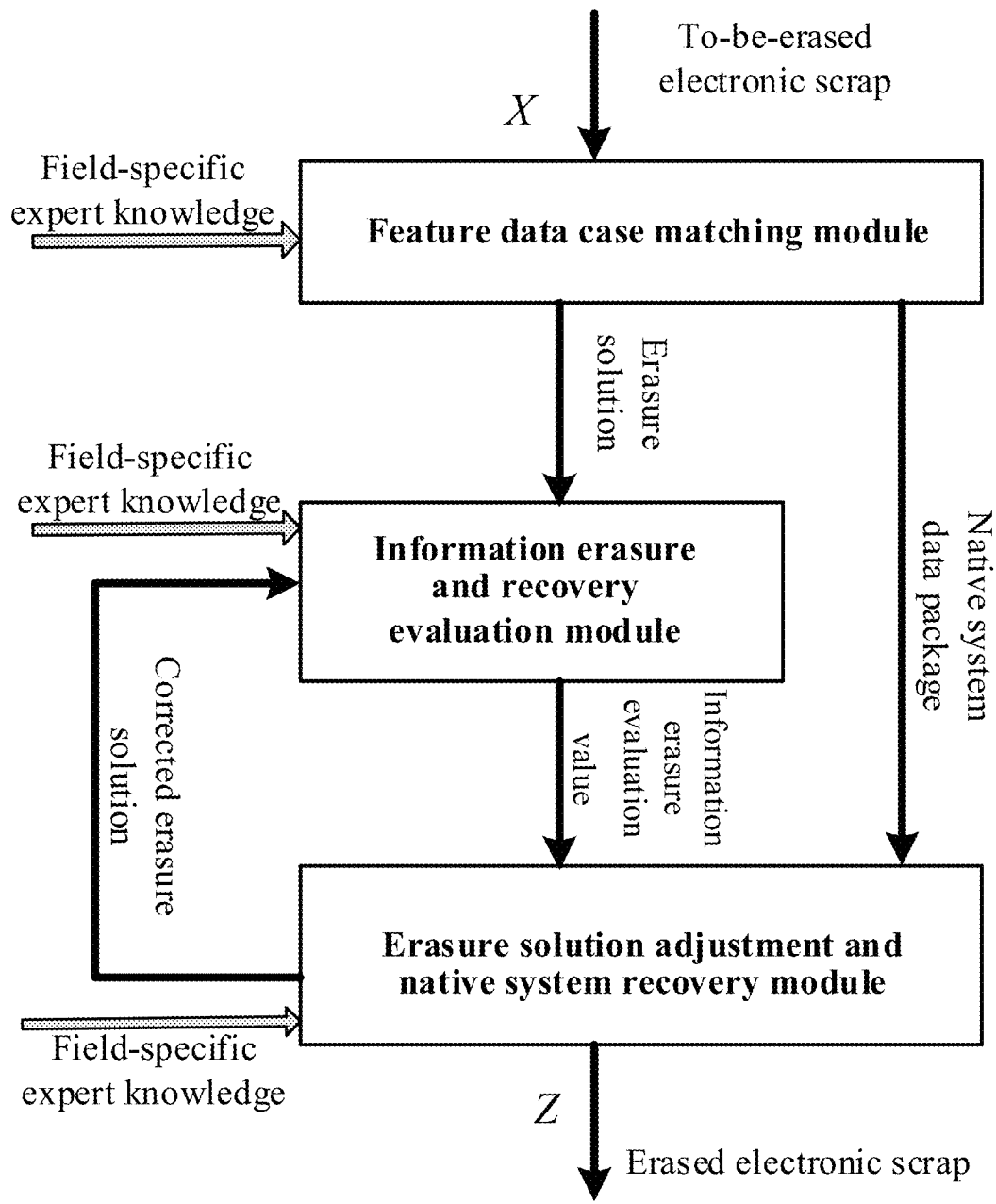
FIG. 1 shows an embodiment of a policy for erasing information from electronic scrap based on a dual-security mechanism.
Figure 2:
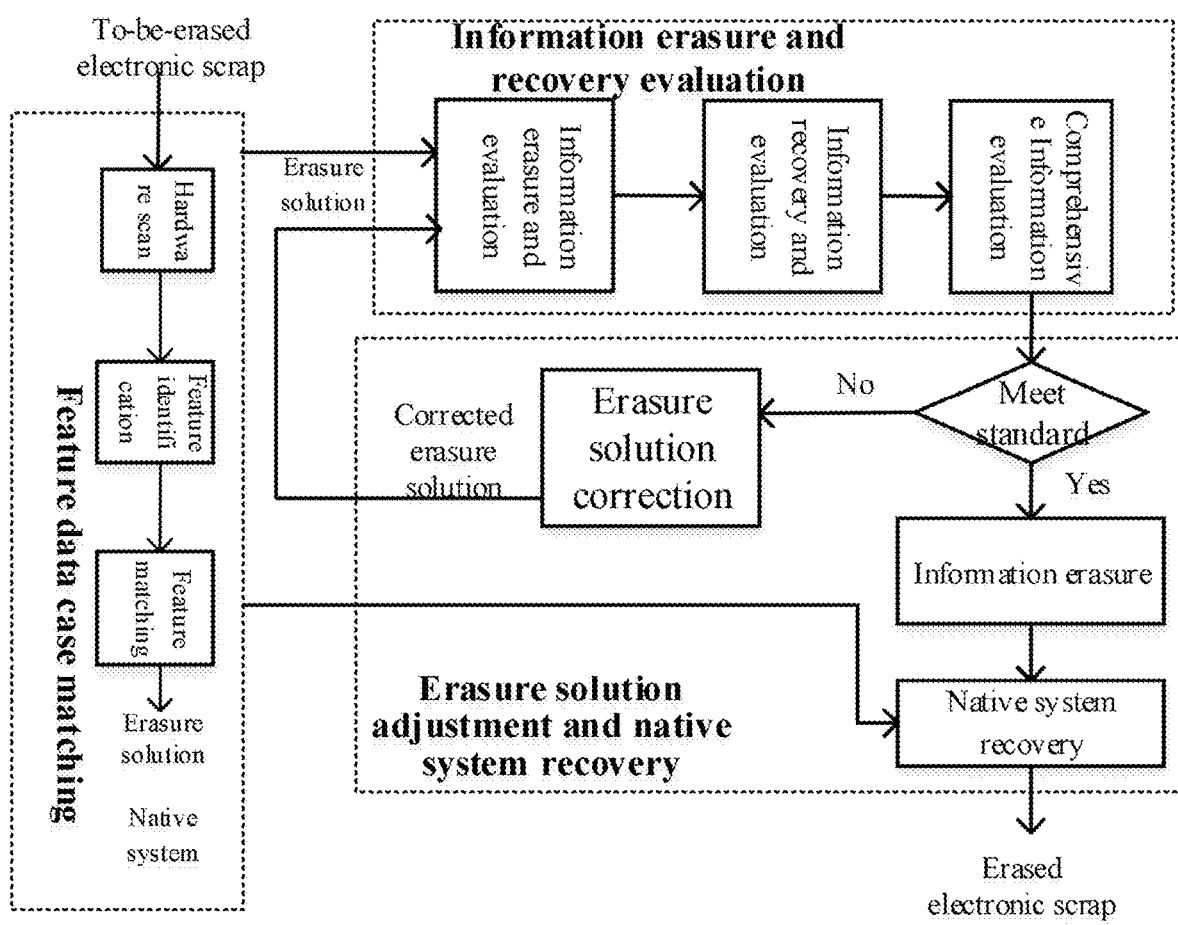
FIG. 2 is a flowchart of an embodiment of a method for erasing information from electronic scrap based on a dual-security mechanism.

In accordance with the inventive concepts, provided is a method for erasing information from electronic scrap based on a dual-security mechanism. The method is implemented using a feature data case matching module, an information erasure and recovery evaluation module, and an erasure solution adjustment and native system recovery module, as shown in FIG. 1 and FIG. 2.

Feature Data Case Matching Module

Inputs of the module are to-be-erased electronic scrap X and field-specific expert knowledge $K_{now}$. Outputs are an erasure solution $\{\lambda_{pass}, S, \lambda_{size}, \lambda_{order}, \ldots\}$, and a native system data package $u_{data}$ for the to-be-erased electronic scrap. The module is used to obtain the erasure solution, and the native system data package $u_{data}$ for the to-be-erased electronic scrap, based on the to-be-erased electronic scrap, the field-specific expert knowledge $K_{now}$, a storage medium feature database $D_{medium}^{data}$, an information erasure feature database $D_{delete}^{data}$, and a firmware system feature database $D_{firmware}^{data}$. A mapping relationship is as follows:

$$\{\{\lambda_{pass}, S, \lambda_{size}, \lambda_{order}, \ldots\}, u_{data}\} = f_{match}(X, D_{medium}^{data}, D_{delete}^{data}, D_{firmware}^{data}) \quad (1)$$

where $f_{match}(\cdot)$ (represents a mapping model for feature extraction and case matching of the to-be-erased electronic scrap. $\lambda_{pass}$ represents overwrite times. $S = \{s_1, L, s_{\lambda_{pass}}\}$ represents a set of $\lambda_{pass}$ overwrite sequences. $s_1, L, s_{\lambda_{pass}}$ may be all-0s sequences, all-1s sequences, random sequences, uncompressed sequences or fixed sequences. $\lambda_{size}$ represents the size of the overwrite packet; $\lambda_{order}$ represent the arrangement order of different overwrite sequences in a overwrite packet.

Information Erasure and Recovery Evaluation Module

Inputs of the module are the erasure solution $\{\lambda_{pass}, S, \lambda_{size}, \lambda_{order}, \ldots\}$, and the field-specific expert knowledge $K_{now}$. Outputs are the information erasure feature $\{\eta_{delete}^{null}, \eta_{delete}^{damage}, \ldots\}$, the information recovery feature $\{\eta_{recover}^{iden}, \eta_{recover}^{back}, \ldots\}$, and a comprehensive dual-security evaluation value $\xi_{combine}$. The module is used to perform, based on the erasure solution and field-specific expert knowledge, information erasure and evaluation on the to-be-erased electronic scrap, perform information recovery and evaluation, and obtain the comprehensive dual-security evaluation value. A mapping relationship is as follows:

$$\{\{\eta_{delete}^{null}, \eta_{delete}^{damage}, \ldots\}, \{\eta_{recover}^{iden}, \eta_{recover}^{back}, \ldots\}, \xi_{combine}\} = f_{estimate}(\{\lambda_{pass}, S, \lambda_{size}, \lambda_{order}, \ldots\}, X, K_{now}) \quad (2)$$

where $f_{estimate}(\cdot)$ represents a mapping model for implementing the foregoing process.

Erasure Solution Adjustment and Native System Recovery Module

Inputs of the module are the information erasure feature $\{\eta_{delete}^{null}, \eta_{delete}^{damage}, \ldots\}$, the information recovery feature $\{\eta_{recover}^{iden}, \eta_{recover}^{back}, \ldots\}$, the comprehensive dual-security evaluation value $\xi_{combine}$, solution $\{\lambda_{pass}, S, \lambda_{size}, \lambda_{order}, \ldots\}$, the native system data package $u_{data}$, and the field-specific expert knowledge $K_{now}$. Outputs are a corrected erasure solution $\{\lambda_{pass}^{new}, S^{new}, \lambda_{size}^{new}, \lambda_{order}^{new}, \ldots\}$, and the electronic scrap with the native system recovered Z. The module is used to completely erase the information based on corrected information erasure solutions, to obtain the electronic scrap with the native system recovered. A mapping relationship is as follows:

$$\{\{\lambda_{pass}^{new}, S^{new}, \lambda_{size}^{new}, \lambda_{order}^{new}, \ldots\}, Z\} = f_{UpWr}(\{\eta_{delete}^{null}, \eta_{delete}^{damage}, \ldots\}, \{\eta_{recover}^{iden}, \eta_{recover}^{back}, \ldots\}, \xi_{combine}, \{\lambda_{pass}, S, \lambda_{size}, \lambda_{order}, \ldots\}, u_{data}, K_{now}) \quad (3)$$

where $f_{UpWr}(\cdot)$ represents a mapping model that can represent the erasure solution adjustment and native system recovery process.

Figure 3:
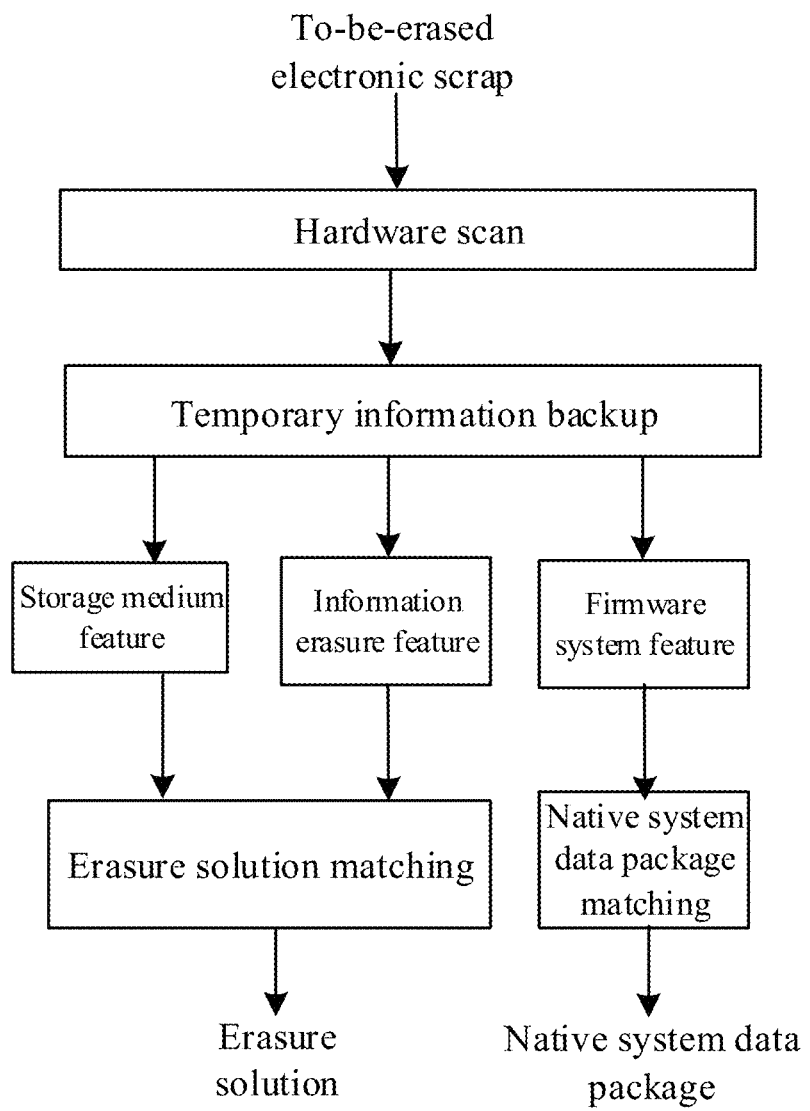
FIG. 3 is a flowchart of an embodiment of a method for matching feature data cases.

As shown in FIG. 3, in a preferred embodiment, the workflow for the feature data case matching module is as follows. The inputs of the module are the to-be-erased electronic scrap X and the field-specific expert knowledge $K_{now}$. The outputs are the erasure solution $\{\lambda_{pass}, S, \lambda_{size}, \lambda_{order}, \ldots\}$, and the native system data package $u_{data}$ for the to-be-erased electronic scrap. The intermediate processing process includes sub-modules such as hardware scan, temporary information backup, storage medium feature identification, information erasure feature identification, erasure solution matching, firmware system feature identification, and firmware system feature matching.

A basic structure of the designed storage medium feature database $D_{medium}^{data}$ is as follows:

$$[\{MediumType, Capacity, AdressMode, WRmode, \ldots\}, \{\lambda_{pass}, \lambda_{size}, \lambda_{order}, \ldots\}] \quad (4)$$

where $\{MediumType, Capacity, AdressMode, WRmode, L\}$ represents features of a storage medium such as a type, a capacity, an addressing mode, and a read/write mode.

A basic structure of the designed information erasure feature database $D_{delete}^{data}$ is as follows:

$$[\{ComStorage,ComFormat,ComCode,PriName,PriLang,PriFormat,PriPath, \ldots \},\{S, \ldots \}] \quad (5)$$

where {ComStorage,ComFormat,ComCode,PriName,PriLang,PriFormat,PriPath,L} represents information erasure features such as a common data storage location, a common data format, a common data encoding rule, an independent software name, an independent software development language, an independent software data format, and an independent software installation path.

A basic structure of the designed firmware system feature database $D_{firmware}^{data}$ is as follows:

$$[\{SysType, SysVersion, DevLang, RunMech, FileDir, L\}, u_{data}] \quad (6)$$

where {SysType,SysVersion,DevLang,RunMech,FileDir,L} represents firmware system features such as a system type, a system version, a development language, an operating mechanism, and a standard file directory.

The following process is performed for the to-be-erased electronic scrap X. Firstly, connect to the to-be-erased electronic scrap through a data interface, scan the to-be-erased electronic scrap in a hardware scan module, temporarily back up the information contained in the to-be-erased electronic scrap, and identify the storage medium feature, the information erasure feature, and the firmware system feature based on the scanned information. This process is expressed as follows:

$$X \xrightarrow{f_{scan}(\bullet)} X_{data} \xrightarrow{f_{iden}(\bullet)} \{d_{medium}^{fea}, d_{delete}^{fea}, d_{firmware}^{fea}\} \quad (7)$$

where $f_{scan}(\bullet)$ represents the process of scanning the to-be-erased electronic scrap and $f_{iden}(\bullet)$ represents the process of identifying the storage medium feature $d_{medium}^{fea}$, the information erasure feature $d_{delete}^{fea}$, and the firmware system feature $d_{firmware}^{fea}$ of the to-be-erased electronic scrap.

Next, combine with the identified storage medium feature $d_{medium}^{fea}$, the identified information erasure feature $d_{delete}^{fea}$, the storage medium feature database $D_{medium}^{data}$ and the information erasure feature database $D_{delete}^{data}$ to match and obtain the erasure solution $\{\lambda_{pass}, S, \lambda_{size}, \lambda_{order}, \ldots \}$. This process is expressed as follows:

$$\{\lambda_{pass}, S, \lambda_{size}, \lambda_{order} \ldots \} = f_{match}^{solution}(d_{medium}^{fea}, d_{delete}^{fea}, D_{medium}^{data}, D_{delete}^{data}) \quad (8)$$

where $f_{match}^{solution}$ is a matching model based on a case reasoning algorithm.

Reference for the case-based reasoning algorithm: Yan Aijun, Qian Limin, Wang Pu: *A Comparative Study on a Weight Allocation Model for Case Reasoning Attributes*, ACTA Automatica Sinica, 2014, 40(09):1896-1902.

Then, match the identified firmware system feature $d_{firmware}^{fea}$ with the firmware system feature database $D_{firmware}^{data}$ to obtain the native system data package $u_{data}$. This process is expressed as follows:

$$u_{data} = f_{match}^{firmware}(d_{firmware}^{fea}, D_{firmware}^{data}) \quad (9)$$

where $f_{match}^{firmware}(\bullet)$ is a matching model based on a case reasoning algorithm.

Reference for the case-based reasoning algorithm: Yan Aijun, Qian Limin, Wang Pu: *A Comparative Study on a Weight Allocation Model for Case Reasoning Attributes*, ACTA Automatica Sinica, 2014, 40(09):1896-1902.

Figure 4:
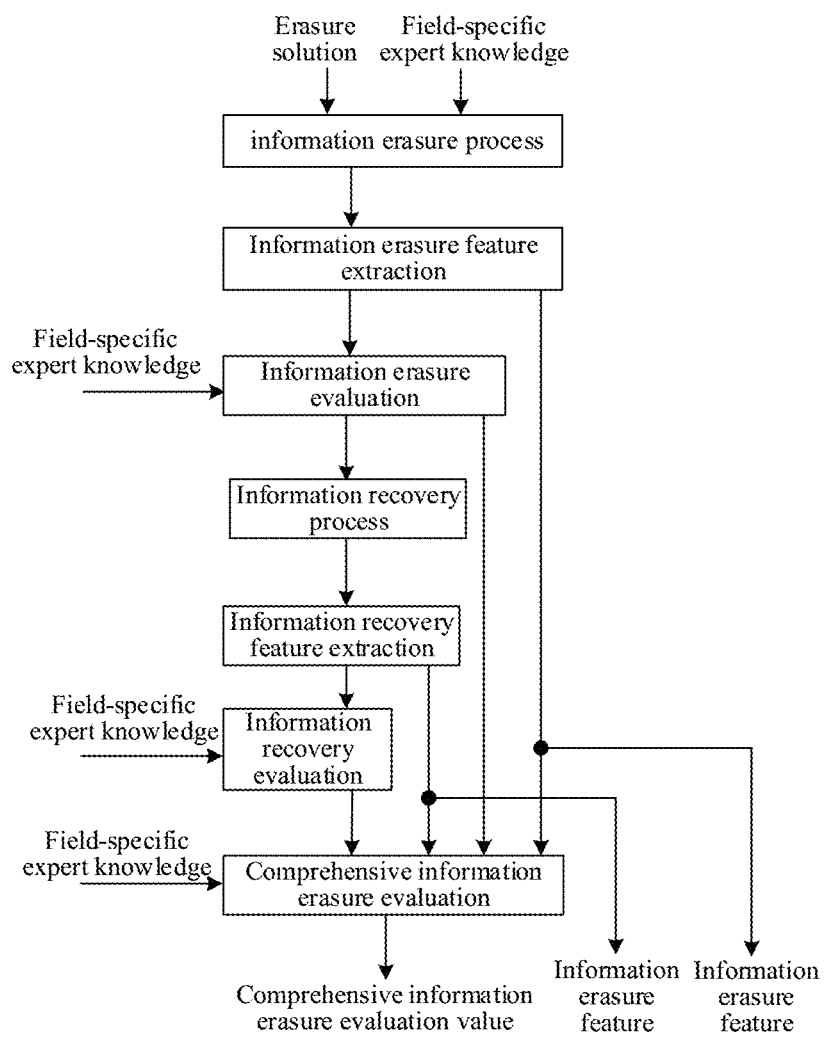
FIG. 4 is a flowchart of an embodiment of a method for evaluating information erasure and recovery effects.

As shown in FIG. 4, the workflow for the information erasure and recovery evaluation module is as follows. The inputs of the module are the erasure solution $\{\lambda_{pass}, S, \lambda_{size}, \lambda_{order}, \ldots \}$, and the field-specific expert knowledge $K_{now}$. The outputs are the information erasure feature $\{\eta_{delete}^{null}, \eta_{delete}^{damage}, \ldots \}$, the information recovery feature $\{\eta_{recover}^{iden}, \eta_{recover}^{back}, \ldots \}$, and the comprehensive dual-security evaluation value $\xi_{combine}$. The intermediate process includes sub-modules such as information erasure, information erasure feature extraction, erasure effect evaluation, information recovery, information recovery feature extraction, information recovery effect evaluation, and comprehensive dual-security evaluation.

The specific implementation process is as follows: erase the information of the to-be-erased electronic scrap X based on the given erasure solution $\{\lambda_{pass}, S, \lambda_{size}, \lambda_{order}, \ldots \}$, extract an information erasure feature of the erased electronic scrap, and evaluate an information erasure effect. This process is expressed as follows:

$$X \xrightarrow{f_{delete}(\bullet)} X_{delete} \xrightarrow{f_{delete}^{extra}(\bullet)} \{\eta_{delete}^{null}, \eta_{delete}^{damage}, L\} \xrightarrow{f_{delete}^{estimate}(\bullet)} \xi_{delete} \quad (10)$$

where $X_{delete}$ represents the erased electronic scrap; $\xi_{delete}$ represents an information erasure evaluation value obtained by an information erasure model $f_{delete}^{estimate}(\bullet)$; $f_{delete}(\bullet)$ represents the process of erasing the information; $f_{delete}^{extra}(\bullet)$ represents the process of extracting the information erasure feature of $X_{delete}$; and $f_{delete}^{estimate}(\bullet)$ represents an erasure evaluation model that is implemented using a neural network algorithm. Reference for the neural network algorithm: Li Long, Wei Jing, Li Canbing, Cao Yijia, Song Junying, Fang Baling: *Load Model Prediction Based on an Artificial Neural Network*, Transactions of China Electrical Technology, 2015, 30(08):225-230.

Here $\{\eta_{delete}^{null}, \eta_{delete}^{damage}, L\}$ represents features such as an available space percentage and a damaged space percentage of $X_{delete}$, and calculation formulas are as follows:

$$\eta_{delete}^{null} = \frac{\text{Available storage capacity}}{\text{Rated storage capacity} - \text{Used storage capacity}} \times 100\% \quad (11)$$

$$\eta_{delete}^{damage} = \frac{\text{Damaged storage capacity}}{\text{Rated storage capacity} - \text{Used storage capacity}} \times 100\% \quad (12)$$

Use the information recovery mechanism to recover the information of $X_{delete}$, extract an information recovery feature of the recovered electronic scrap $X_{recover}$, and evaluate an information recovery effect. This process is expressed as follows:

$$X_{delete} \xrightarrow{f_{recover}(\bullet)} X_{recover} \xrightarrow{f_{recover}^{extra}(\bullet)} \{\eta_{recover}^{iden}, \eta_{recover}^{back}, L\} \xrightarrow{f_{recover}^{estimate}(\bullet)} \xi_{recover} \quad (13)$$

where $X_{recover}$ represents the electronic scrap obtained after information recovery is performed on $X_{delete}$; $\xi_{recover}$ represents an information recovery evaluation value obtained by an information recovery evaluation model $f_{recover}^{estimate}(\cdot)$; $f_{recover}(\cdot)$ represents the process of recovering the information; $f_{recover}^{extra}(\cdot)$ represents the process of extracting the information recovery feature of $X_{recover}$; and $f_{recover}^{estimate}(\cdot)$ represents an information recovery evaluation model that is implemented using the neural network algorithm.

Reference for the neural network algorithm: Li Long, Wei Jing, Li Canbing, Cao Yijia, Song Junying, Fang Baling: *Load Model Prediction Based on an Artificial Neural Network*, Transactions of China Electrical Technology, 2015, 30(08):225-230.

$\{\eta_{recover}^{iden}, \eta_{recover}^{back}, L\}$ represents features such as a recoverable data identification rate and a recovery degree of $X_{recover}$, and calculation formulas are as follows:

$$\eta_{recover}^{iden} = \frac{\text{Identifiable data fragment bytes}}{\text{Total original data file bytes}} \times 100\% \quad (14)$$

$$\eta_{recover}^{back} = \frac{\text{Recovered data units}}{\text{Original data file units}} \times 100\% \quad (15)$$

Evaluate the information erasure and recovery processes based on the field-specific expert knowledge $K_{now}$ and the preceding information to obtain the comprehensive dual-security evaluation value $\xi_{combine}$. This process is expressed as follows:

$$\xi_{combine} = f_{del\_recover}^{estimate}(\{\eta_{delete}^{null}, \eta_{delete}^{damage}, L\}, \{\eta_{recover}^{iden}, \eta_{recover}^{back}, L\}, \xi_{delete}, \xi_{recover}, K_{now}) \quad (16)$$

where $f_{del\_recover}^{estimate}(\cdot)$ represents a comprehensive dual-security evaluation model that is implemented using a case reasoning algorithm.

Reference for the case-based reasoning algorithm: Yan Aijun, Qian Limin, Wang Pu: *A Comparative Study on a Weight Allocation Model for Case Reasoning Attributes*, ACTA Automatica Sinica, 2014, 40(09):1896-1902.

Figure 5:
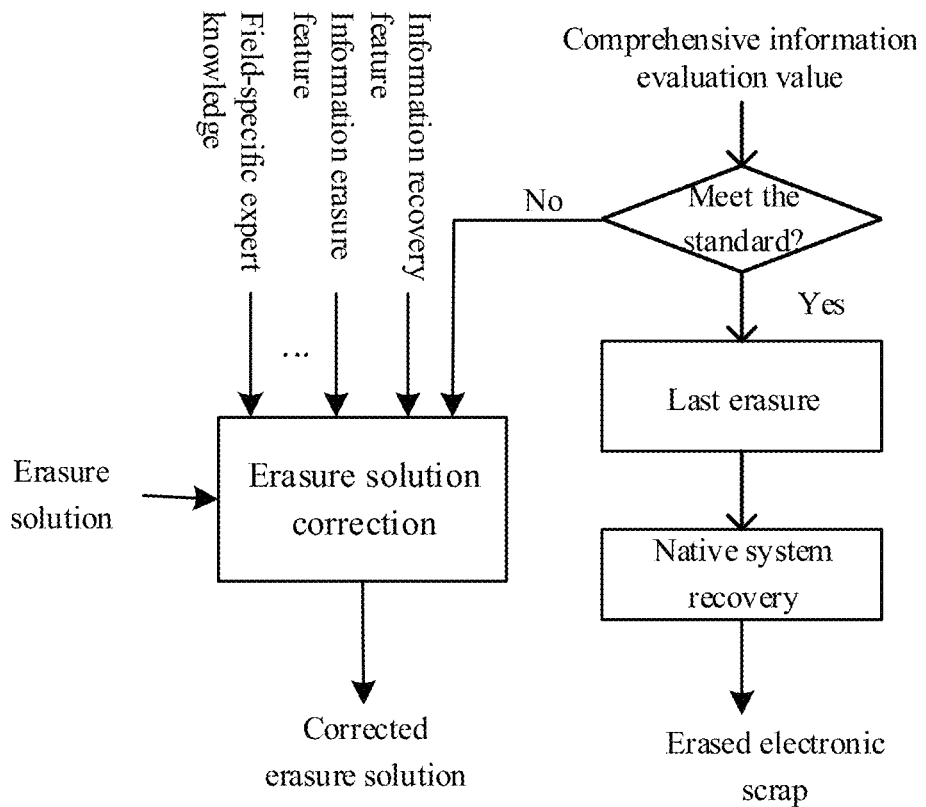
FIG. 5 is a flowchart of an embodiment of a method for adjusting an information erasure solution and recovering a native system.

As shown in FIG. 5, the workflow for the erasure solution adjustment and native system recovery module is as follows. The inputs of the module are the information erasure feature $\{\eta_{delete}^{null}, \eta_{delete}^{damage}, \ldots\}$, the information recovery feature $\{\eta_{recover}^{iden}, \eta_{recover}^{back}, \ldots\}$, the comprehensive dual-security evaluation value $\xi_{combine}$, erasure solution $\{\lambda_{pass}, S, \lambda_{size}, \lambda_{order}, \ldots\}$, the native system data package $u_{data}$, and the field-specific expert knowledge $K_{now}$. The outputs are the corrected erasure solution $\{\lambda_{pass}^{new}, S^{new}, \lambda_{size}^{new}, \lambda_{order}^{new}, \ldots\}$, and the electronic scrap with the native system recovered Z. The intermediate processing process includes sub-modules such as determining of a dual-security evaluation result, erasure solution correction, information erasure, and native system recovery.

The specific implementation process is as follows. Firstly, compare the obtained comprehensive dual-security evaluation value $\lambda_{combine}$ with a threshold $\xi_{set}$ specified based on the expert knowledge. If $\xi_{combine}^{new} \leq \xi_{set}$, perform a last erasure operation, and then recover the native system. This process is expressed as follows:

$$X_{recover} \xrightarrow{f_{delete}^{last}(\cdot)} X_{delete}^{last} \xrightarrow{f_{write}(\cdot)} Z \quad (17)$$

where $f_{delete}^{last}(\cdot)$ represents the process of the last erasure operation; and $X_{delete}^{last}$ represents the electronic scrap obtained after the $f_{delete}^{last}(\cdot)$ operation is performed on $X_{recover}$. If $\xi_{combine} > \xi_{set}$, correct the information erasure solution based on a storage medium feature $d_{medium}^{fea}$, an information erasure feature $d_{delete}^{fea}$, a firmware system feature $d_{firmware}^{fea}$, and the native system data package $u_{data}$ of the to-be-erased electronic scrap, an erasure solution $\{\lambda_{pass}, S, \lambda_{size}, \lambda_{order}, \ldots\}$ used by the information erasure and recovery evaluation module, a storage medium feature database $D_{medium}^{data}$, an information erasure feature database $D_{delete}^{data}$, a firmware system feature database $D_{firmware}^{data}$, and the field-specific expert knowledge $K_{now}$. This process is expressed as follows:

$$\{\lambda_{pass}^{new}, S^{new}, \lambda_{size}^{new}, \lambda_{order}^{new}, \ldots\} = f_{update}$$
$$(\xi_{combine}, d_{medium}^{fea}, d_{delete}^{fea}, d_{firmware}^{fea}, \{\lambda_{pass}, S, \lambda_{size}, \lambda_{order}, \ldots\}, D_{medium}^{data}, D_{delete}^{data},$$
$$D_{firmware}^{data}, K_{now}, X, \{\eta_{delete}^{null}, \eta_{delete}^{damage}, \ldots\}, \{\eta_{recover}^{iden}, \eta_{recover}^{back}, \ldots\}) \quad (18)$$

where $f_{update}(\cdot)$ represents a mapping model for updating the erasure solution, which is implemented using a case reasoning algorithm.

Reference for the case-based reasoning algorithm: Yan Aijun, Qian Limin, Wang Pu: *A Comparative Study on a Weight Allocation Model for Case Reasoning Attributes*, ACTA Automatica Sinica, 2014, 40(09):1896-1902.

Above $d_{medium}^{fea}$, $d_{delete}^{fea}$, and $d_{firmware}^{fea}$ represent the storage medium feature, the information erasure feature, and the firmware system feature of the to-be-erased electronic scrap; $\{\eta_{delete}^{null}, \eta_{delete}^{damage}, \ldots\}$ represents the information erasure feature obtained after information erasure is performed on X; and $\{\eta_{recover}^{iden}, \eta_{recover}^{back}, \ldots\}$ represents the information recovery feature obtained after information recovery is performed on $X_{delete}$.

The original information erasure solutions are replaced with new information erasure solution:

$$\{\lambda_{pass}, S, \lambda_{size}, \lambda_{order}, \ldots\} \leftarrow \{\lambda_{pass}^{new}, S^{new}, \lambda_{size}^{new}, \lambda_{order}^{new}, \ldots\} \quad (19)$$

Then, use the new information erasure solution to evaluate an information erasure and new recovery effect until anew comprehensive dual-security evaluation value $\xi_{combine}^{new} \leq \xi_{set}$ is obtained.

To sum up, this application proposes a method for erasing information based on a dual-security mechanism. Its novelty lies in intelligently generating, based on features of to-be-erased electronic scrap, an erasure solution that can achieve both efficiency and security. Its main idea is to: build a storage medium feature database, an information erasure feature database, and a firmware system feature database to match cases for the to-be-erased electronic scrap; generate an erasure solution and a native system data package based on the matching results; erase the information, evaluate an erasure result, recover the information on the erased electronic scrap, and evaluate a recovery result, to implement comprehensive double security evaluation; check the information erasure validity of the electronic scrap based on the evaluation results; and if an erasure result is invalid, correct erasure solutions online based on the evaluation result, until the erasure result is valid and the electronic scrap with a native system recovered is obtained. The method according to this application provides information erasure solutions for different systems. Case matching improves the information erasure efficiency. Information erasure and recovery evaluation ensures secure erasure. Erasure solution correction provides a unified solution for different electronic scrap and achieves both efficiency and security in the information erasure process.

REFERENCES

1. Zhou Jing: Study on Promoting the Development of China's Scrap Mobile Phone Recycling Industry Through Standardization[J], Quality and Standardization, 2018 (01):41-43.
2. Ye Diqing: On Recycling of Computers, Mobile Phones, and Other Electronic Scrap[J], Resource Conservation and Environmental Protection, 2014(01):144.
3. Wang Jianfeng: Data destruction: an Important Branch in Data Security[J], Computer Security, 2006(08):53-54.
4. Ye Qingming: Research on MDA-based SQLite Fragment Data Erasure Technology[D], Kunming University of Science and Technology, 2016.
5. Xu Jing, Zhu Youdian, Lai Fan: Data Destruction Technology for Magnetic Storage Media[J], Journal of Southwest China Normal University (Natural Science Edition), 2007(04):107-110.
6. Yin Yanbin, Wen Weiping: Secure Computer Data Erasure and Privacy Protection[J], Information Network Security, 2009(05):55-58.
7. Chen En, Liu Xiaojie, Li Tao, Lu Zhengtian, Hu Xiaoqin, Dong Chengxi: Design and Implementation of a Database Destruction System[J], Computer Engineering and Design, 2008(10):2499-2501.
8. Wang Ben, Zhu Dali, Sun Degang: Research and Verification of Overwriting-based Information Erasure Technology[C], Proceedings of the 18th National Conference on Information Confidentiality, Beijing: Jincheng Publishing House, 2008.
9. Wei Chengwei, Liu Liwei, Wang Nan, Li Yong: Application and Research of Data Destruction Technology[J], Computer and Modernization, 2010(10):180-182.
10. Li Tao: Information Storage and Information Destruction Technology[J], Information Security and Technology, 2010(06):45-48.
11. Shen HeLei, On Information Erasure Technology[J], Information Security and Communication Confidentiality, 2009(08):92-94.
12. Lu Zhengtian, Li Tao, Hu Xiaoqin, Zhao Kui, Zeng Jinquan, Peng Lingxi: A Data Self-Destruction Method [J], Application Research of Computers, 2009, 26(01): 350-351+355.
13. Wang Ben: Research and Implementation of Storage Media Information Erasure Technology[D], Beijing Jiaotong University, 2009.
14. Bai Yang: Research and Implementation of Windows-based Magnetic Medium Data Erasure Technology[D], Hubei University of Technology, 2010.
15. Qi Feng, Gao Qi, He Peng: Research on Method for Erasing Information from Solid State Storage and Devices [J], Secrecy Science and Technology, 2011(06):54-59.
16. Sun Dian: Design and Implementation of Android-based Data Recovery and Erasure Software[D], Beijing University of Posts and Telecommunications, 2014.
17. Zhou Kaimin, Zhao Qiang, Zhang Xiao, Deng Gaoming: Research on Residual Data Erasure and Security[J], 2006 (17):2769-2771.
18. Wu Shasha, Wang Minshen, Wu Yiping, Xiong Jinbo: Secure Erasure of Data on Storage Media, Computer Systems & Applications, 2017, 26(11):36-44.
19. Shang Fang, Wang Xiaoyu, Li Sheng, Zhang Tong: Development and Application of a Parallel High-Speed Electronic Data Destruction Platform[J], Heilongjiang Electric Power, 2017, 39(06):547-550+556.
20. Huang Wuming, Ma Zheng, Ji Xiaojiang: Method and System for Performing ROM Flashing or Data Erasure on Multiple Mobile Concurrently[P], Chinese Patent: CN108271150A, 2018 Jul. 10.
21. Du Yinxia: Study on Securely Erasing Residual Data from Hard Drives[D], Hebei University of Science and Technology, 2012.
22. Han Bing, Zhang Tong, You Junsheng, Wang Xiaoyu, Shang Fang, Liu Sheng, Zhong Zhichen: Portable Electronic Data Erasure Apparatus Based on USB Flash Drive[P], Chinese Patent: CN103294960A, 2013 Sep. 11.
23. Han Bing, Zhang Tong, You Junsheng, Wang Xiaoyu, Shang Fang, Liu Sheng, Zhong Zhichen: Portal Apparatus for Erasing Data from Electronic Storage Medium and Data Erasure Method Based on Said Apparatus[P], Chinese Patent: CN103295638A, 2013 Sep. 11.
24. Liu Jun, Xu Changle, Geng Lida: Method for Completely Erasing Original Information on Smartphone[P], Chinese Patent: CN107277089A, 2017 Oct. 20.
25. Yang Guodong, Kang Hongjuan, Guo Xin, Tan Yuanquan: Information Erasure System and Method for Android Device[P], Chinese Patent: CN109683918A, 2019 Apr. 26.
26. Jing Yixin, Han Min, Tang Wei, Yu Pengfei, Liao Wei: Apparatus and Method for Erasing Information from Secret-related Storage Medium[P], Chinese Patent: CN103117084A, 2016 Apr. 13.
27. Wang Xinxin, Wang Jinguo, Cui Xin'an: Method and Apparatus for Completely Erasing Files Based on Linux File System[P], Chinese Patent: CN109656888A, 2019 Apr. 19.
28. Shi Jia, Zhang Hengliang, He Xiaoyan: Method and Apparatus for Erasing Data from Storage System[P], Chinese Patent: CN103902468A, 2014 Jul. 2.
29. Wang Yuan, Xia Fan, Chen Ningyi, Zhou Yunfeng: Method and Apparatus for Erasing Information on Terminal Device[P], Chinese Patent: CN106909542A, 2017 Jun. 3.
30. Li Minghao: Data Erasure Method and Apparatus[P], Chinese Patent: CN107562376A, 2018 Jan. 9.
31. He Yuanhang, Yang Jie, Zhang Liangliang, Liu Jinlu, Liu Jia, Xu Bingjie: Data Erasure Method Based on Quantum Random Number[P], Chinese Patent: CN107562384A, 2018 Jan. 9.
32. Gutmann P. Secure deletion of data from magnetic and solid-state memory[C]//Proceedings of the Sixth USENIX Security Symposium, San Jose, Calif. 1996, 14: 77-89.
33. Wei M Y C, Grupp L M, Spada F E, et al. Reliably Erasing Data from Flash-based Solid State Drives[C]// FAST. 2011, 11: 8-8.
34. Fundo A, Hysi A, Tafa I. Secure Deletion of Data from SSD[J]. 2014.
35. Sun K, Choi J, Lee D, et al. Models and design of an adaptive hybrid scheme for secure deletion of data in consumer electronics[J]. IEEE Transactions on Consumer Electronics, 2008, 54(1): 100-104.
36. Lee J, Heo J, Cho Y, et al. Secure deletion for NAND flash file system[C]//Proceedings of the 2008 ACM symposium on Applied computing. ACM, 2008: 1710-1714.
37. Swanson S, Wei M. Safe: Fast, verifiable sanitization for ssds[J]. University of California, San Diego, Tech. Rep, 2010.

38. Liu C, Khouzani H A, Yang C. Erasucrypto: A lightweight secure data deletion scheme for solid state drives [J]. Proceedings on Privacy Enhancing Technologies, 2017, 2017(1): 132-148.
39. Reardon J, Basin D, Capkun S. Sok: Secure data deletion[C]//2013 IEEE symposium on security and privacy. IEEE, 2013: 301-315.
40. Gnatyuk S, Kinzeryavyy V, Sapozhnik T, et al. Modern Method and Software Tool for Guaranteed Data Deletion in Advanced Big Data Systems[C]//International Conference of Artificial Intelligence, Medical Engineering, Education. Springer, Chain, 2018: 581-590.
41. Vaisanen K, Lalli L, Brew J. Apparatus, a system, a method and a computer program for erasing data stored on a storage device: U.S. Pat. No. 9,286,231[P]. 2016 Mar. 15.
42. LeGargean B, Gonzalo V. Method and system for verifying a data erasure process: WO. Patent 18/052,703 [P]. 2018 Feb. 2.
43. Kellokoski P, Torma M, Nurminen P, et al. Data Erasure Method and Apparatus: U.S. patent application Ser. No. 16/334,344[P]. 2019 Jul. 11.

What is claimed is:

1. A computer-implemented method for erasing information based on a dual-security mechanism, comprising:
   a) identifying a storage medium feature of an electronic scrap X and identifying an information erasure feature of the electronic scrap X, and matching identified storage medium feature and identified information erasure feature in a storage medium feature database and an information erasure feature database to determine an erasure solution; and
   identifying a firmware system feature of the electronic scrap X and matching identified firmware system feature in a firmware system feature database to determine a native system data package for rewriting after the information is securely erased;
   wherein step a) is expressed as follows:

$$X \xrightarrow{f_{iden}(\bullet)} \{d_{medium}^{fea}, d_{delete}^{fea}, d_{firmware}^{fea}\},$$

$$\{\lambda_{pass}, S, \lambda_{size}, \lambda_{order}, \ldots\} = f_{match}^{solution}(d_{medium}^{fea}, d_{delete}^{fea}, D_{medium}^{data}, D_{delete}^{data}), \text{ and}$$

$$u_{data} = f_{match}^{firmware}(d_{firmware}^{fea}, D_{firmware}^{data});$$

wherein:
   $f_{iden}(\bullet)$ represents the process of identifying the storage medium feature $d_{medium}^{fea}$, the information feature $d_{delete}^{fea}$ and the firmware system feature $d_{firmware}^{fea}$ of the electronic scrap X;
   $f_{match}^{solution}$ represents the process of matching the identified storage medium feature and the identified information feature in the storage medium feature database $D_{medium}^{data}$ and the information erasure feature database $D_{delete}^{data}$ to output the erasure solution $\{\lambda_{pass}, S, \lambda_{size}, \lambda_{order}, \ldots\}$,
   $D_{delete}^{data}$ represents information erasure features comprising a common data storage location, a common data format, a common data encoding rule, an independent software name, an independent software development language, an independent software data format and an independent software installation path;
   $\lambda_{pass}$ represents overwrite times, S represents a set of overwrite sequences, $\lambda_{size}$ represents a size of an overwrite packet, and
   $\lambda_{order}$ represents an arrangement order of overwrite sequences in the overwrite packet;
   $f_{match}^{firmware}(\bullet)$ represents the process of matching the identified firmware system feature in the firmware system feature database $D_{firmware}^{data}$ to output the native system data package $u_{data}$;
   b) executing the erasure solution for the electronic scrap X to obtain an electronic scrap $X_{delete}$, extracting a feature of the electronic scrap $X_{delete}$, and evaluating an erasure effect by using an information erasure evaluation model;
   wherein step b) is expressed as follows:

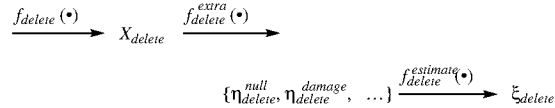

wherein:
   $f_{delete}(\bullet)$ represents the process of erasing information on the electronic scrap X;
   $f_{delete}^{extra}(\bullet)$ represents the process of extracting the feature of the electronic scrap $X_{delete}$ to output $\{\eta_{delete}^{null}, \eta_{delete}^{damage}, \ldots\}$;
   wherein $\{\eta_{delete}^{null}, \eta_{delete}^{damage}, \ldots\}$ represents features comprising an available space percentage and a damaged space percentage of the electronic scrap $X_{delete}$, $$\eta_{delete}^{null} = \frac{\text{Available storage capacity}}{\text{Rated storage capacity} - \text{Used storage capacity}} \times 100\%,$$

$$\eta_{delete}^{damage} = \frac{\text{Damaged storage capacity}}{\text{Rated storage capacity} - \text{Used storage capacity}} \times 100\%;$$

and
   $\xi_{delete}$ represents the information erasure effect obtained by the information erasure evaluation model $f_{delete}^{estimate}(\bullet)$;
   c) recovering the information on the electronic scrap $X_{delete}$ to obtain an electronic scrap $X_{recover}$, extracting a feature of the electronic scrap $X_{recover}$, and evaluating an information recovery effect by using an information recovery evaluation model;
   wherein step c) is expressed as follows:

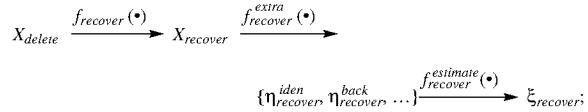

wherein:
   $f_{recover}^{extra}(\bullet)$ represents the process of extracting the feature of the electronic scrap $X_{recover}$ to output $\{\eta_{recover}^{idea}, \eta_{recover}^{back}, \ldots\}$;
   wherein $\{\eta_{recover}^{idea}, \eta_{recover}^{back}, \ldots\}$ represents features including recoverable data identification rate and a recovery degree of $X_{recover}$, $$\eta_{recover}^{iden} = \frac{\text{Identifiable data fragment bytes}}{\text{Total original data file bytes}} \times 100\%,$$

$$\eta_{recover}^{back} = \frac{\text{Recovered data units}}{\text{Original data file units}} \times 100\%;$$

$f_{recover}(\bullet)$ represents the process of recovering the information on the electronic scrap $X_{delete}$;

$\xi_{recover}$ represents the information recovery effect obtained by the information recovery evaluation model $f_{recover}^{estimate}(\bullet)$; and d) evaluating a combined effect by using a dual-security evaluation model based on field-specific expert knowledge, the information erasure effect and the information recovery effect to determine whether the information erasure result meets a set standard;

e) correcting the erasure solution obtained in step a) to generate a new erasure solution, and repeating steps b) to d) until the information erasure result meets the set standard if the information erasure result does not meet the set standard; and f) performing a last erasure operation on the electronic scrap $X_{recover}$ to obtain an electronic scrap $X^{last}_{delete}$, formatting the electronic scrap $X^{last}_{delete}$, and writing a matching native system according to the native system data package into the electronic scrap $X^{last}_{delete}$ to obtain an electronic scrap Z with the native system recovered if the information erasure meets the set standard;

wherein step d) is expressed as follows:

$\xi_{combine} = f_{del\_recover}^{estimate}(\{\eta_{delete}^{null}, \eta_{delete}^{damage}, \ldots\}, \{\eta_{recover}^{iden}, \eta_{recover}^{back}, \ldots\}, \xi_{delete}, \xi_{recover}, K_{now})$;

wherein:

$\xi_{combine}$ represents the combined effect obtained by the dual-security evaluation model $f_{del\_recover}^{estimate}(\bullet)$; and $K_{now}$ is the field-specific expert knowledge;

wherein step e) is expressed as follows:

$\xi_{combine} > \xi_{set}$, and $\{\lambda_{pass}^{new}, S^{new}, \lambda_{size}^{new}, \lambda_{order}^{new}, \ldots\} = f_{update}(\xi_{combine}, d_{medium}^{fea}, d_{delete}^{fea}, d_{firmware}^{fea}, \{\lambda_{pass}, S, \lambda_{size}, \lambda_{order}, \ldots\}, D_{medium}^{data}, D_{delete}^{data}, D_{firmware}^{data}, K_{now}, X, \{\eta_{delete}^{null}, \eta_{delete}^{damage}, \ldots\}, \{\eta_{recover}^{iden}, \eta_{recover}^{back}, \ldots\})$;

wherein:

$\xi_{combine}$ is the combined effect and $\xi_{set}$ is a threshold of the set standard;

$f_{update}(\bullet)$ represents the process of correcting the erasure solution in step a) to generate a new erasure solution $\{\lambda_{pass}^{new}, S^{new}, \lambda_{size}^{new}, \lambda_{order}^{new}, \ldots\}$;

wherein step f) is expressed as follows:

$\xi_{combine}^{new} \leq \xi_{set}$, and $$X_{recover} \xrightarrow{f_{delete}^{last}(\bullet)} X_{delete}^{last} \xrightarrow{f_{write}(\bullet)} Z;$$

Wherein:

$f_{delete}^{last}(\bullet)$ represents the process of performing the last erasure operation on the electronic scrap $X_{recover}$ to obtain the electronic scrap $X_{delete}^{last}$;

$f_{write}(\bullet)$ represents the process of writing a matching native system according to the native system data package into the electronic scrap $X_{delete}^{last}$ to obtain the electronic scrap Z.

2. The method of claim 1, wherein step a) further comprises scanning the electronic scrap X and temporarily backing up the information contained in the electronic scrap X.

3. The method of claim 1, wherein the storage medium feature database $D_{medium}^{data}$ is expressed by

[{MediumType,Capacity,AdressMode, WRmode, ... },{$\lambda_{pass}, \lambda_{size}, \lambda_{order}, \ldots$}], wherein {MediumType,Capacity,AdressMode, WRmode, ... } represents storage medium features comprising a type, a capacity, an addressing mode and a read/write mode;

the information erasure feature database $D_{delete}^{data}$ is expressed by

[{ComStorage,ComkFormat,ComCode,PriName,PriLang,PriFormat,PriPath, ... },{S, ... }]

wherein

{ComStorage, ComFormat, ComCode,PriName,PriLang, PriFormat,PriPath, ... } represents the information erasure features comprising the common data storage location, the common data format, the common data encoding rule, the independent software name, the independent software development language, the independent software data format and the independent software installation path; and the firmware system feature database $D_{firmware}^{data}$ is expressed by

[{SysType,SysVersion,DevLang,RunMech, FileDir, ... },$u_{data}$], wherein {SysType,SysVersion,DevLang,RunMech, FileDir, ... } represents firmware system features comprising a system type, a system version, a development language, an operating mechanism and a standard file directory.

\* \* \* \* \*